(No Model.)

A. J. WILBUR.
ROTARY CUTTER.

No. 324,970. Patented Aug. 25, 1885.

Witnesses.
Lauritz N. Möller
John R. Snow

Inventor.
Andrew J. Wilbur
by his attorney,
J. E. Maynadier

UNITED STATES PATENT OFFICE.

ANDREW J. WILBUR, OF BOSTON, MASSACHUSETTS.

ROTARY CUTTER.

SPECIFICATION forming part of Letters Patent No. 324,970, dated August 25, 1885.

Application filed June 22, 1885. (No model.)

*To all whom it may concern:*

Be it known that I, ANDREW J. WILBUR, a citizen of the United States, residing at Boston, in the county of Suffolk and State of Massachusetts, have invented a new and useful Improvement in Rotary Cutters, of which the following is a specification, reference being had to the accompanying drawings, in which—

Figure 1:
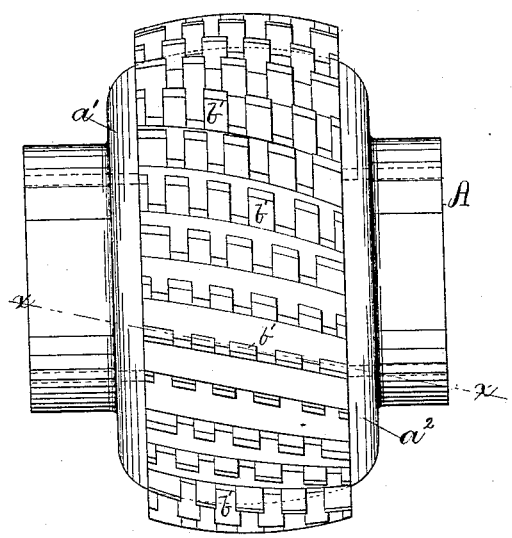
Figure 2:
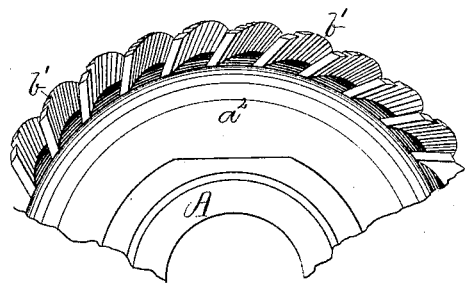
Figure 3:
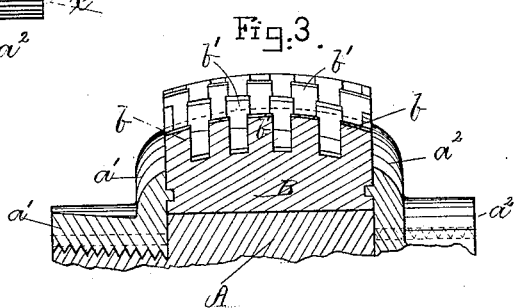
Figure 4:
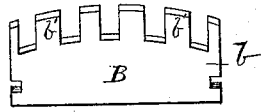
Figure 5:
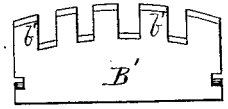

Figure 1 is a plan of one form of my cutters. Fig. 2 is an end view. Fig. 3 is a sectional view on line $x\ x$ of Fig. 1, and Figs. 4 and 5 show a pair of blades.

My invention consists in a rotary cutter having a hub of any suitable construction, to which a series of blades are firmly secured, each blade consisting of a back and a series of teeth projecting from the back and somewhat resembling a comb.

In the drawings the hub A, with slits to receive the blades B B', and the clamping-nuts $a'\ a^2$ are of a well-known construction, but the blades B B', formed of the back $b$ and teeth $b'$, are new with me.

When a series of my blades are properly arranged about a hub, as shown in the drawings, a very efficient and durable cutter is produced, especially well adapted for trimming the heels of boots and shoes.

The means shown for holding the blades in place constitute no part of my invention and are too well known to require description.

What I claim as my invention is—

The series of blades B B', each blade consisting of a back, $b$, and teeth $b'$, arranged about a hub so that the teeth of one blade cover the openings between the teeth of the next adjacent one, as set forth.

ANDREW J. WILBUR.

Witnesses:
WM. A. COPELAND,
EDWARD S. BEACH.